(12) United States Patent
Gundrum et al.

(10) Patent No.: US 6,436,282 B1
(45) Date of Patent: Aug. 20, 2002

(54) FLOW CONTROL MODULE FOR RO WATER TREATMENT SYSTEM

(75) Inventors: Robert R. Gundrum, Sheboygan; Michael J. Kurth, Howards Grove; Michael D. Steinhardt, Kiel, all of WI (US)

(73) Assignee: Plymouth Products, Inc., Sheboygan, WI (US)

( * ) Notice: Subject to any disclaimer, the term of this patent is extended or adjusted under 35 U.S.C. 154(b) by 0 days.

(21) Appl. No.: 09/633,995

(22) Filed: Aug. 8, 2000

(51) Int. Cl.⁷ .............................................. B01D 63/00
(52) U.S. Cl. ........................ 210/117; 210/137; 210/136; 210/257.2; 210/335; 210/418
(58) Field of Search ................................ 210/109, 110, 210/137, 232, 257.2, 321.65, 335, 440, 136, 117, 418, 541; 137/510, 877; D23/209

(56) References Cited

U.S. PATENT DOCUMENTS

| 4,021,343 | A | 5/1977 | Tyler |
| 4,176,063 | A | 11/1979 | Tyler |
| 4,604,194 | A | 8/1986 | Entingh |
| 4,609,466 | A | 9/1986 | McCausland et al. |
| 4,657,674 | A | 4/1987 | Burrows |
| 4,695,375 | A | 9/1987 | Tyler |
| 4,741,823 | A | 5/1988 | Olsen et al. |
| 4,876,002 | A | 10/1989 | Marshall et al. |
| 5,002,664 | A | 3/1991 | Clack et al. |
| 5,045,197 | A | 9/1991 | Burrows |
| 5,082,557 | A | 1/1992 | Grayson et al. |
| 5,122,265 | A | 6/1992 | Mora et al. |
| 5,128,035 | A | 7/1992 | Clack et al. |
| 5,143,601 | A | * 9/1992 | Slovak et al. |
| 5,662,793 | A | 9/1997 | Beall, Jr. |
| 5,891,334 | A | * 4/1999 | Gundrum et al. |

* cited by examiner

*Primary Examiner*—Joseph W. Drodge
*Assistant Examiner*—Terry K. Cecil
(74) *Attorney, Agent, or Firm*—Andrus, Sceales, Starke & Sawall

(57) ABSTRACT

A unitary multi-function control module 18 for a reverse osmosis water purification system provides all of the necessary flow control functions in a single removable and easily replaceable unit. The module connects directly with a unitary injection molded manifold 14 and includes a control housing having a cover plate 42, a main body 40, and a closure plate 47. The control housing entirely encloses therein the supply flow shutoff valve 46, the reverse osmosis flow control 100, the permeate back flow check valve 82, and all of the interconnections between the manifold and the supply, permeate, and brine flow paths.

15 Claims, 12 Drawing Sheets

FLOW CONTROL MODULE FOR RO WATER TREATMENT SYSTEM

BACKGROUND OF THE INVENTION

The present invention relates to a system for treating water for drinking using reverse osmosis membrane separation and, more particularly, to a flow control module for use in such a system whereby replacement may be easily effected.

Replaceable reverse osmosis (RO) filter cartridges have been used for many years for the purification of drinking water. Systems utilizing RO membrane filter cartridges have been made in many sizes and have often been combined with other types of pre-RO and post-RO filter elements of different types connected in series to provide for the comprehensive removal of contaminants. A typical system which has evolved in the prior art comprises a multi-cartridge system including three serially connected filter units, all of which are contained in similar filter housings that are demountably attached to a common header for handling the various flow distribution lines and connections. It is also typical to provide pure water storage in an interconnected reservoir so that a larger on-demand volume of filtered water may be provided than would normally be available directly from a typical RO filter. In addition to a conventional faucet valve operated by the user to obtain filtered water, a typical system also includes interior valving and flow controls to provide automatic feed water shutoff when the reservoir is full, back pressure control on the RO membrane unit to maintain a proper flow balance, and a check valve to prevent reverse flow of pure water through the RO filter unit. All of these various flow passages and controls result in fairly complex flow patterns and valve arrangements.

Attempts have been made in the prior art to provide common headers for all of the filter elements in a multi-element system. Also, multi-function or modular valve arrangements are shown in the prior art. The use of unitary headers has not adequately addressed the problem of connecting thereto the various flow control devices. Conversely, the use of modular flow control units has typically required complex piping arrangements with many separate connections. In either event, the flow control components may periodically require servicing or replacement and access to the various components is typically difficult and time consuming.

SUMMARY OF THE INVENTION

In accordance with the present invention, a semipermeable membrane filter system, which may include pre-RO and post-RO filter units, utilizes a manifold and a single control module that includes all of the basic valve and flow control components for the system (with the exception of the user on-off faucet control). The control module is readily accessible for easy servicing and replacement of the module. The manifold is operatively connected to the membrane filter unit and includes a supply flow path for directing a pressurized flow of raw water to the membrane filter unit, a permeate flow path for directing membrane permeate (pure water) to a pressurized storage tank, and a brine flow path for directing membrane concentrate to a drain. The control module includes a demountable housing that is attached directly to the manifold and entirely enclosing therein a pressure responsive supply flow shutoff valve, a brine flow control valve, and a permeate flow check valve, as well as the respective interconnections between the manifold and the several valves. The membrane filter unit preferably comprises a reverse osmosis filter cartridge that is removably contained in an open-ended filter housing. The manifold overlies the filter unit and includes a downwardly depending threaded boss to which the threaded open end of the filter housing is attached. The control module mounts to the manifold directly above the threaded boss, and the control housing includes a supply flow outlet in direct fluid connection with a supply flow opening in the manifold boss, a permeate flow inlet in direct fluid communication with a permeate flow opening in the manifold boss, and a brine flow inlet in direct fluid communication with a brine flow opening in the manifold boss.

In the preferred embodiment, the manifold boss defines a cylindrical outer sleeve, and there is further included a cylindrical intermediate sleeve that is concentric with the outer sleeve and defines therewith a first annular space, and a cylindrical inner sleeve that is concentric with said intermediate sleeve and defines therewith a second annular space. The brine flow opening communicates with the first annular space, the supply flow opening communicates with the second annular space, and the permeate flow opening is defined by the interior of the inner sleeve. In the preferred embodiment, the filter cartridge includes a membrane that is wrapped on a hollow tubular core and covered externally with an outer impervious layer. The membrane is disposed with open upper and lower ends and the cartridge is contained in the filter housing to define an open space between the outer layer, the open lower end of the cartridge and the interior of the housing. The first annular space in the boss communicates with said open space, the second annular space communicates with the open upper end of the membrane, and the interior of the inner sleeve communicates with the hollow tubular core of the RO element. First sealing means prevents a cross flow of liquid between the first annular space and the second annular space, and a second sealing means prevents a cross flow of liquid between the second annular space and the interior of the inner sleeve.

In the preferred embodiment, the control module housing comprises a molded plastic body having integrally molded in the body the supply flow interconnection, the permeate flow interconnection, the brine flow interconnection, and a recess for the shutoff valve; and means are provided for mounting the module body to the manifold to simultaneously effect the respective interconnections.

DETAILED DESCRIPTION OF THE PREFERRED EMBODIMENT

Figure 1:
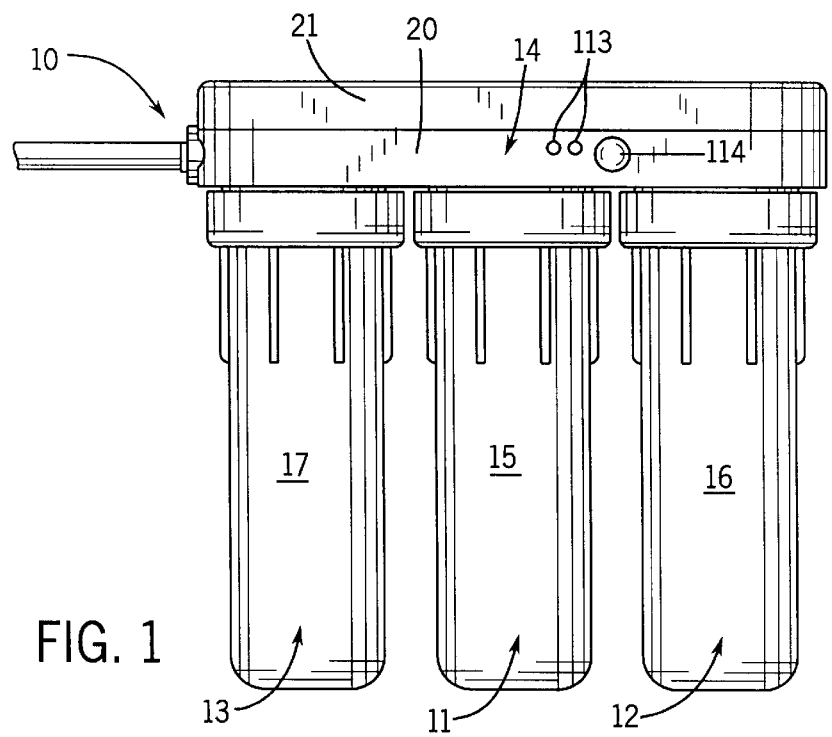
FIG. 1 is a side elevation of a reverse osmosis water purification system of the type utilizing the present invention.
Figure 5:
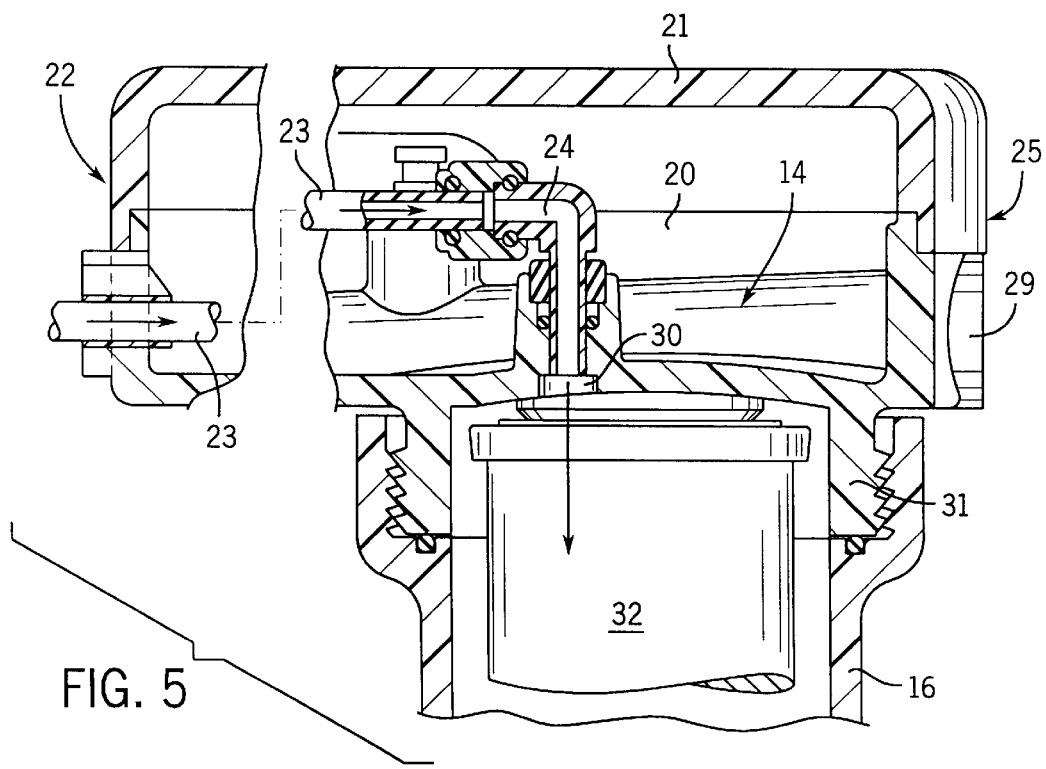
FIG. 5 is a sectional detail taken on line 5—5 of FIG. 4.

FIG. 1 shows a water filter system 10 that includes a reverse osmosis membrane filter unit 11, serially interconnected to a pre-filter unit 12 and a post-filter unit 13 via a common manifold 14. Each of the filter units 11, 12 and 13 includes an open-ended cylindrical housing 15, 16 and 17, respectively, having a threaded upper end for demountable connection to the manifold 14, all in a manner generally known in the prior art.

Figure 16A:
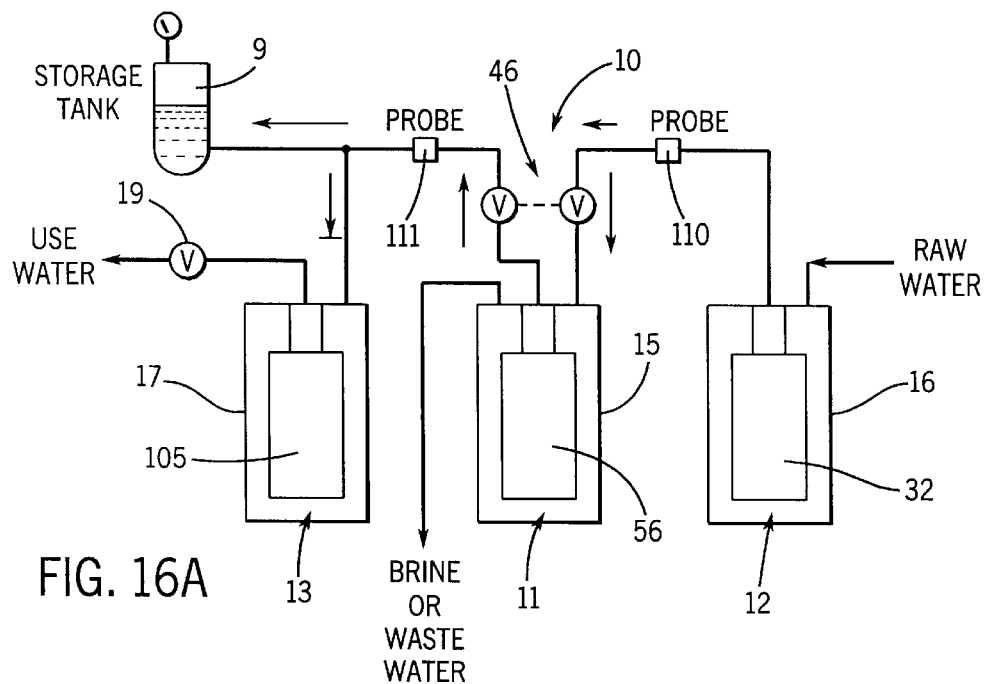
FIGS. 16A and 16B are schematic views of an RO water purification system utilizing the FIG. 1 arrangement and shown operating with the shutoff valve open and closed, respectively, in accordance with the details of FIGS. 15A and 15B.
Figure 16B:
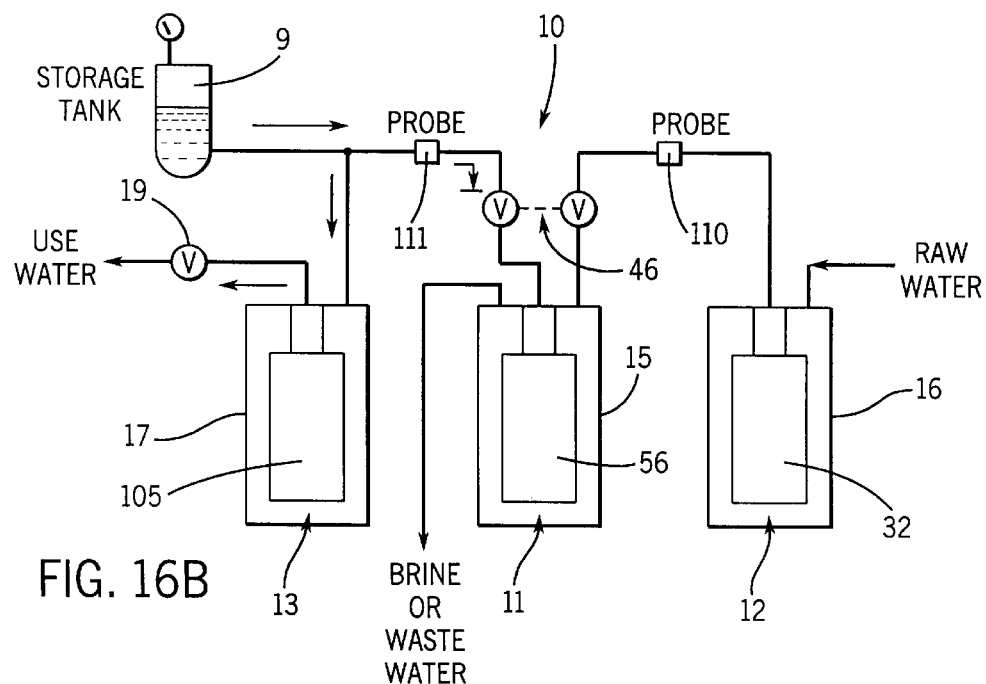

The manifold 14 is preferably a unitary injection molded structure that provides the operative connections to and interconnections between the filter units 11, 12 and 13, as well as the main connections to the source of unfiltered raw water to and from, a filtered water storage tank 9 (FIGS. 16A and 16B), and to a user dispensing faucet 19 (FIGS. 16A and 16B). Though not features necessary to the present invention, the filter system 10 provides a preconditioning of the raw water in the pre-filter unit 12 which may comprise a granular activated carbon filter element; and, a final conditioning of the water either directly from the RO filter unit 11 or from the storage tank 9, via the post-filter unit 13 comprising, for example, an activated carbon block filter element.

The use of an intermediate RO filter unit 11 and a pressurized storage tank require the use of flow controls which would not otherwise be necessary in a filter system using only conventional activated carbon elements, such as those used in the pre-filter and post-filter units 12 and 13, respectively. Thus, in accordance with an important aspect of the present invention, a unitary control module 18 provides a convenient, easily accessible and readily serviceable flow controller for the RO filter unit 11. The control module 18 is adapted to attach directly to the manifold 14, provide direct interconnection between the manifold and the RO filter unit, and to house the necessary flow control elements for the system.

Referring to FIGS. 2–6, the manifold 14 which overlies all three filter units 11, 12 and 13, includes an upstanding peripheral wall 20 over which a removable access cover 21 is attached. An inlet raw water feed line 23 extends through a hole in the peripheral wall 20 on a connection end 22 of the manifold 14 and extends over the manifold to a manifold raw water inlet 24 on an opposite plug end 25 of the manifold. The connection end 22 of the manifold also includes a product water outlet/inlet 26 for connection to the pressurized storage tank 9 and a final water outlet 27 to the user faucet 19.

Raw water, as from a municipal water supply, is supplied to the raw water inlet 24 and passes through the inlet feed line 23 to a pre-filter inlet 30 near the plug end 25 of the manifold. A threaded pre-filter connection boss 31 extends downwardly from the underside of the manifold directly beneath the pre-filter inlet 30 for threaded connection of the pre-filter housing 16 which contains a pre-filter cartridge 32. The pre-filter inlet 30 communicates vertically downwardly through the manifold with the annular space between the pre-filter cartridge 32 and the inside of the housing 16. As is well known in the industry, the raw water flows radially inwardly through the pre-filter cartridge 32, into an axially extending center tube 33 (provided with a pattern of inlet holes), then vertically upwardly through the tube 33 to a sealed connection to the manifold via a central sleeve 34 in the interior of the pre-filter connection boss 31. The pre-filtered water continues along a pre-filtered water connection 35 to the center of the manifold 14 where it enters the control module 18. The pre-filtered water connection has a tapered wall to facilitate a tapered molding core pin and is closed at the plug end (as with plug 29).

As indicated previously, the control module 18 provides various flow interconnections between the manifold 14 and the RO filter unit 11, and further houses a number of valves controlling operation of the RO unit. The control module 18 comprises a housing that is demountably attached to the manifold 14 with a number of screws 37 or similar fasteners connected to suitably threaded bores in small upstanding mounting bosses 38 on the manifold 14.

Figure 12:
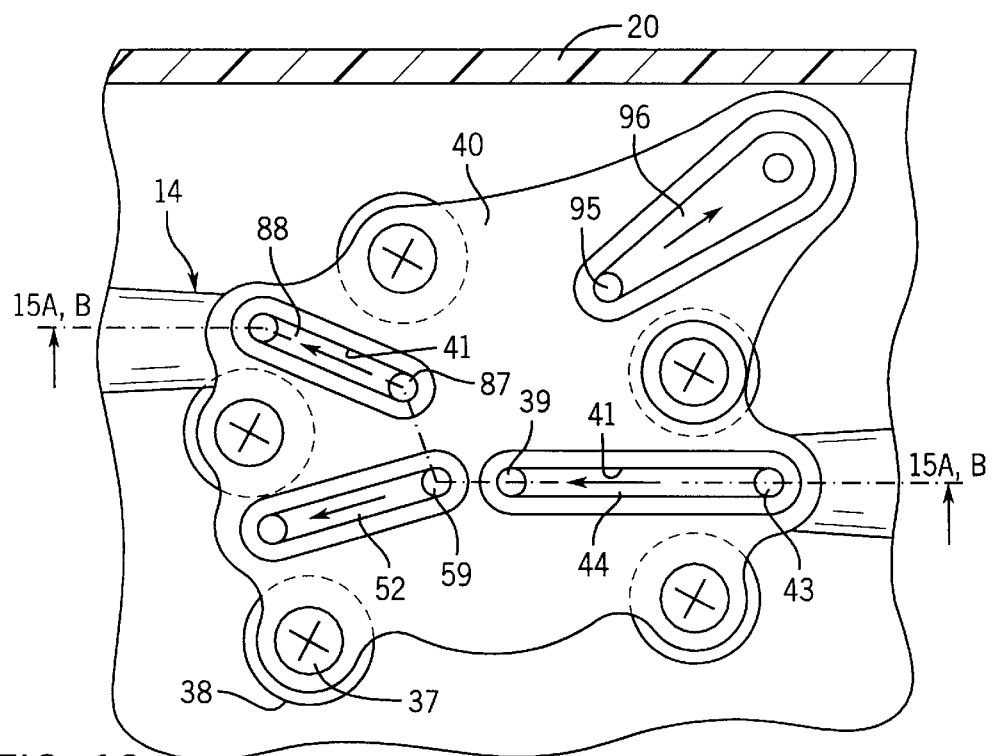
FIG. 12 is a detail of the top of the control module shown in FIG. 4.
Figure 13:
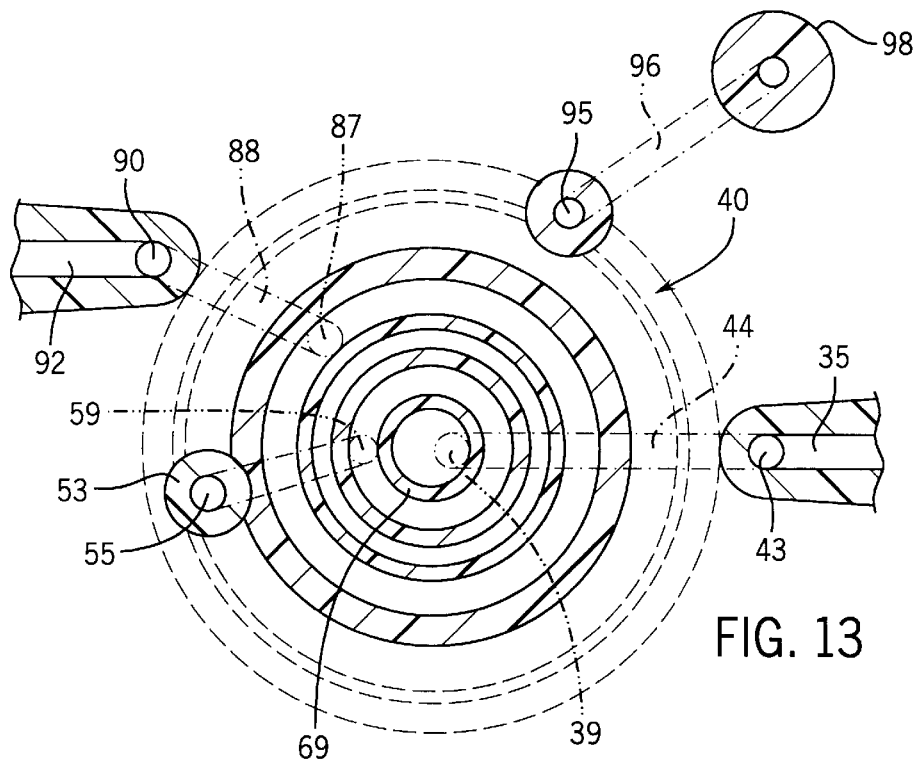
FIG. 13 is a horizontal sectional detail through the control module body.
Figure 14:
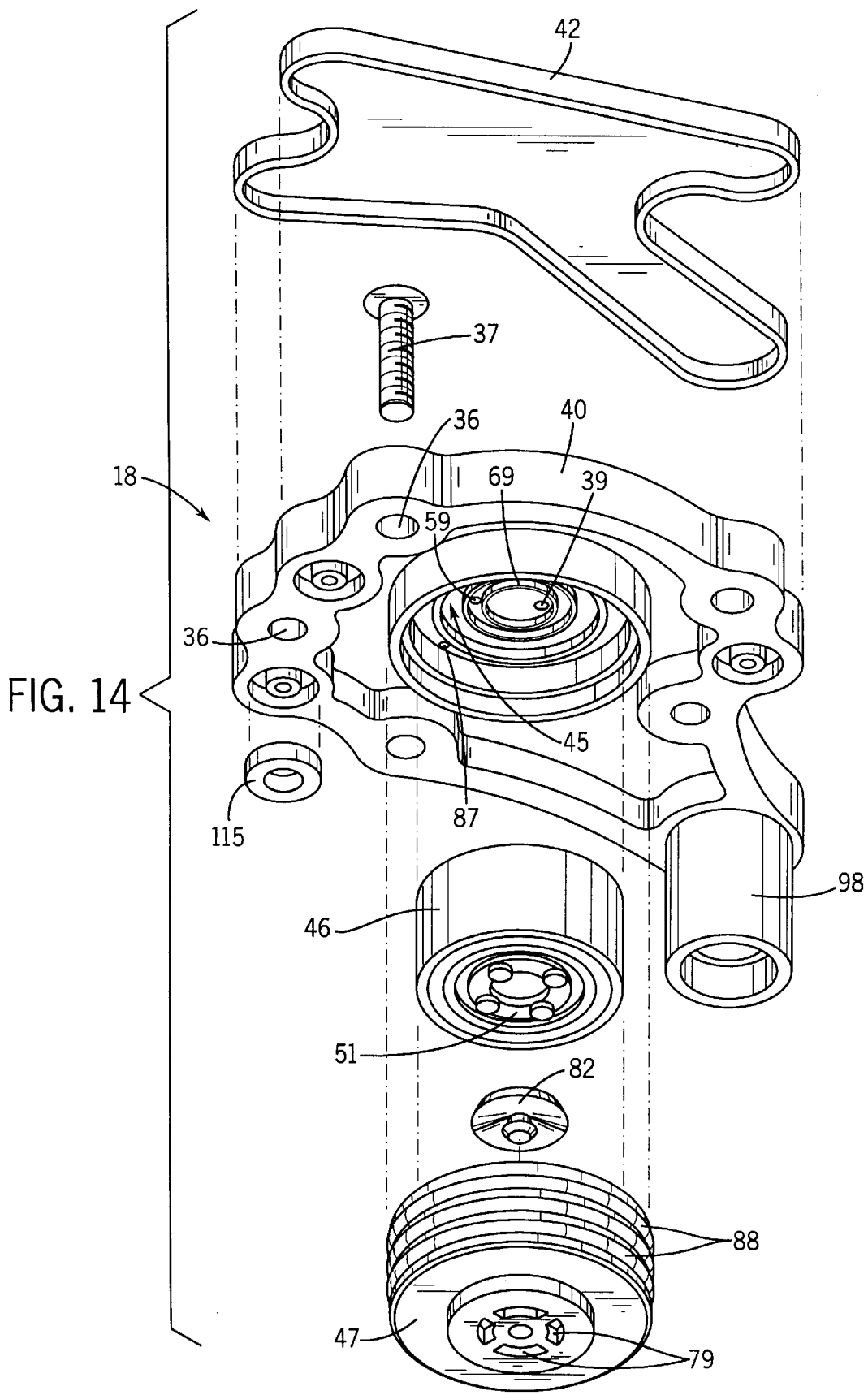
FIG. 14 is an exploded perspective view of the flow control module.

Referring also to FIGS. 12–14, the control module 18 includes a main body 40 in the upper surface of which are formed a number of flow channels 41 (as will be described in greater detail) which are enclosed to form flow passages by a sealing cover plate 42. The downstream end of the pre-filtered water connection 35 terminates in a small tubular inlet sleeve 43 (FIG. 7) which, with the control module 18 fastened in place, communicates with a first inlet passage 44 formed from one of the flow channels 41 in the body of the control module. This first inlet passage 44 defines the first leg of a supply flow interconnection between the manifold 14 and the RO filter unit 11. Passage 44 communicates at its downstream end, via an entry opening 39, with the inside of a downwardly extending cylindrical recess 45 formed in the opposite side of the body 40 of the control module 18. A double diaphragm shutoff valve 46 is disposed in the recess 45 and held therein by a cup-like lower closure plate 47.

The double diaphragm shutoff valve 46 is of conventional construction known in the art and includes an upper diaphragm 50 and a lower diaphragm 51 which are interconnected such that movement of one diaphragm, induced by water pressure applied thereto, will result in corresponding movement of the other diaphragm in the same direction. The downstream end of the first inlet passage 44 communicates with the upper diaphragm 50 via entry opening 39 into recess 45 and thus exposes the upper diaphragm to inlet water pressure. The upstream end of a second inlet passage 52 (comprising one of the flow channels 41 formed in the upper surface of the control module body 40) also communicates with the upper diaphragm 50 via an exit opening 59 from recess 45 and thus, when the net pressure differential is sufficient to move the upper diaphragm downwardly off of its seat against the annular rim 69 at the bottom of the cylindrical recess 45, water will flow into and through the second inlet passage 52. From the downstream end of the second inlet passage, incoming water flows downwardly into a small tubular outlet sleeve 53 formed on the manifold 14. The tubular outlet sleeve 53 opens at its lower end in a supply flow opening 55 within an RO filter connection boss 54 that extends downwardly from the underside of the manifold 14 to provide threaded connection for the RO filter housing 15.

Figure 2:
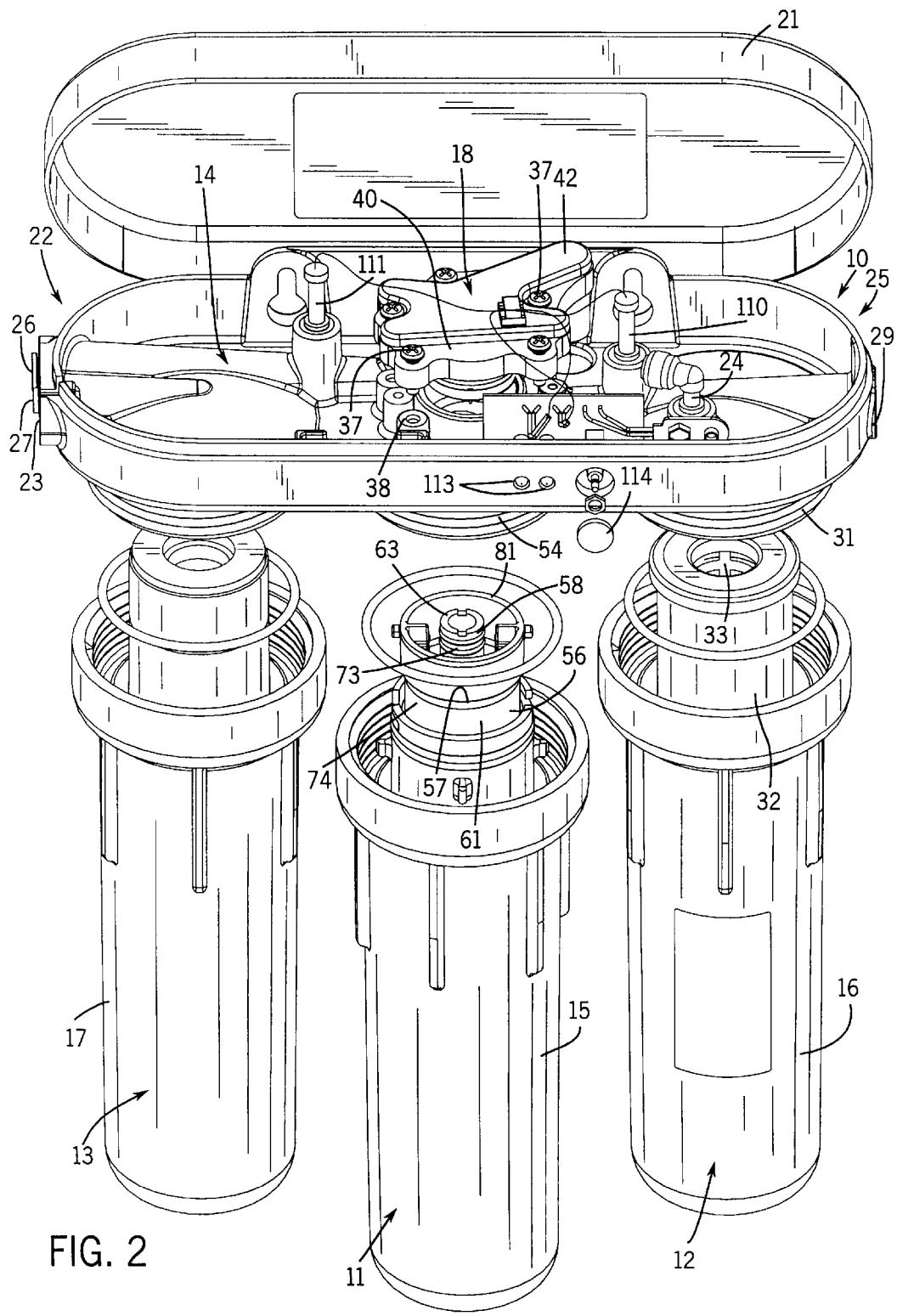
FIG. 2 is an exploded perspective view of the system shown in FIG. 1.
Figure 3:
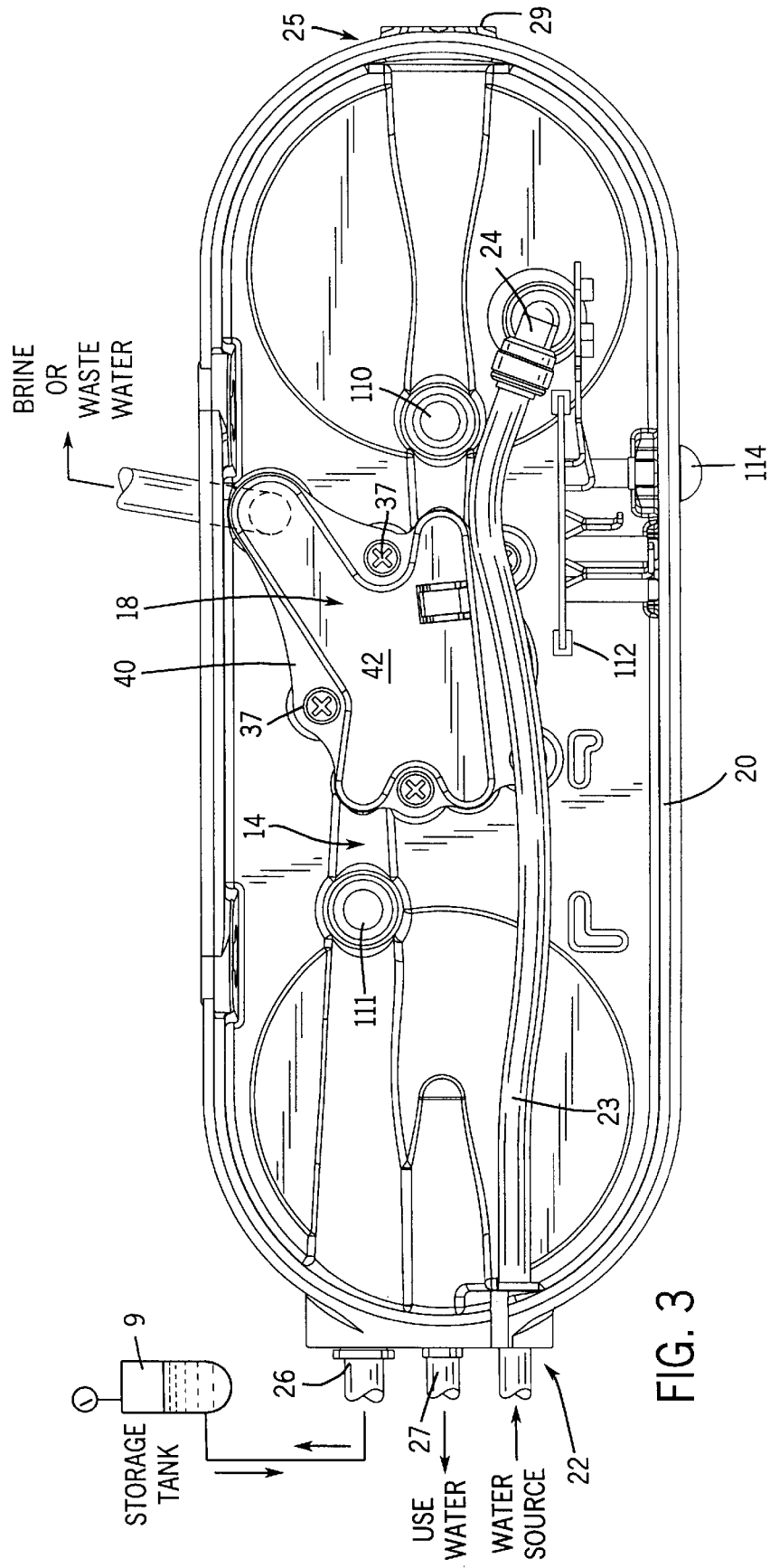
FIG. 3 is a top plan view of the system shown in FIG. 1 with the access cover removed.
Figure 4:
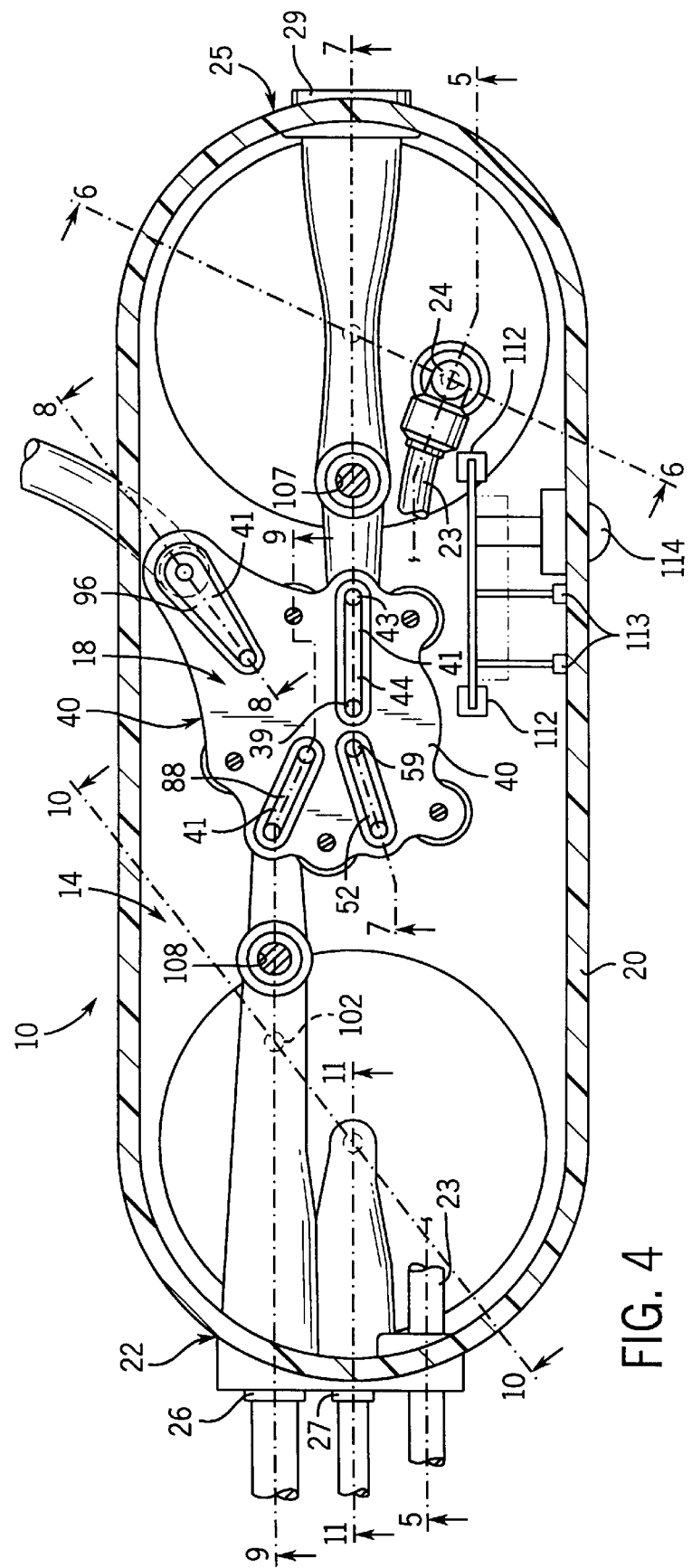
FIG. 4 is a view similar to FIG. 3, but with the cover plate removed from the control module.
Figure 6:
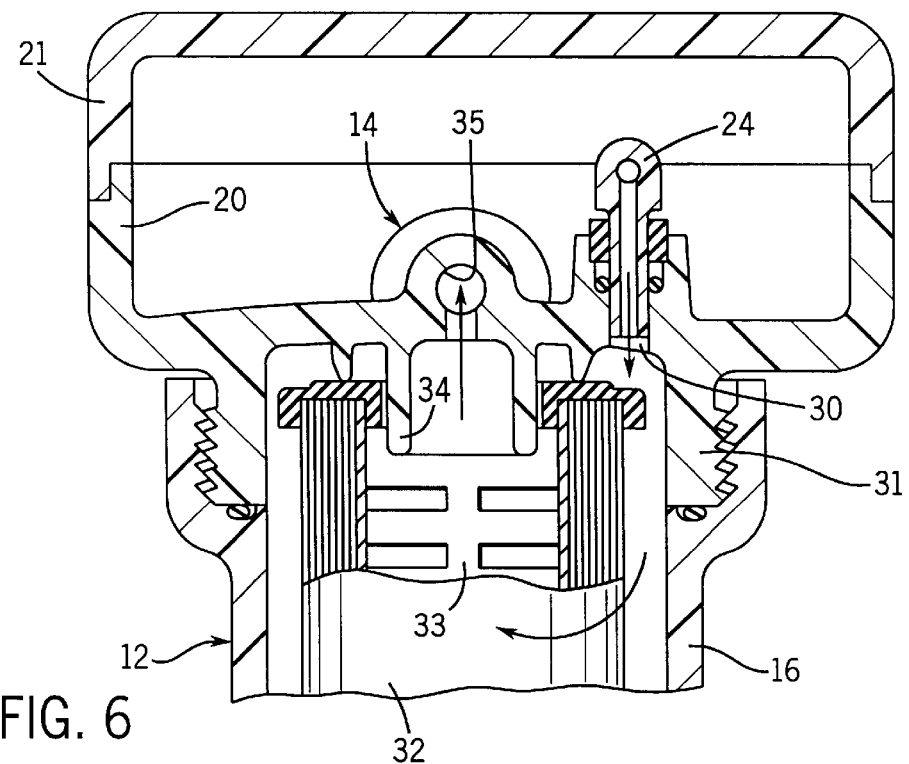
FIG. 6 is a sectional detail taken on line 6—6 of FIG. 4.
Figure 7:
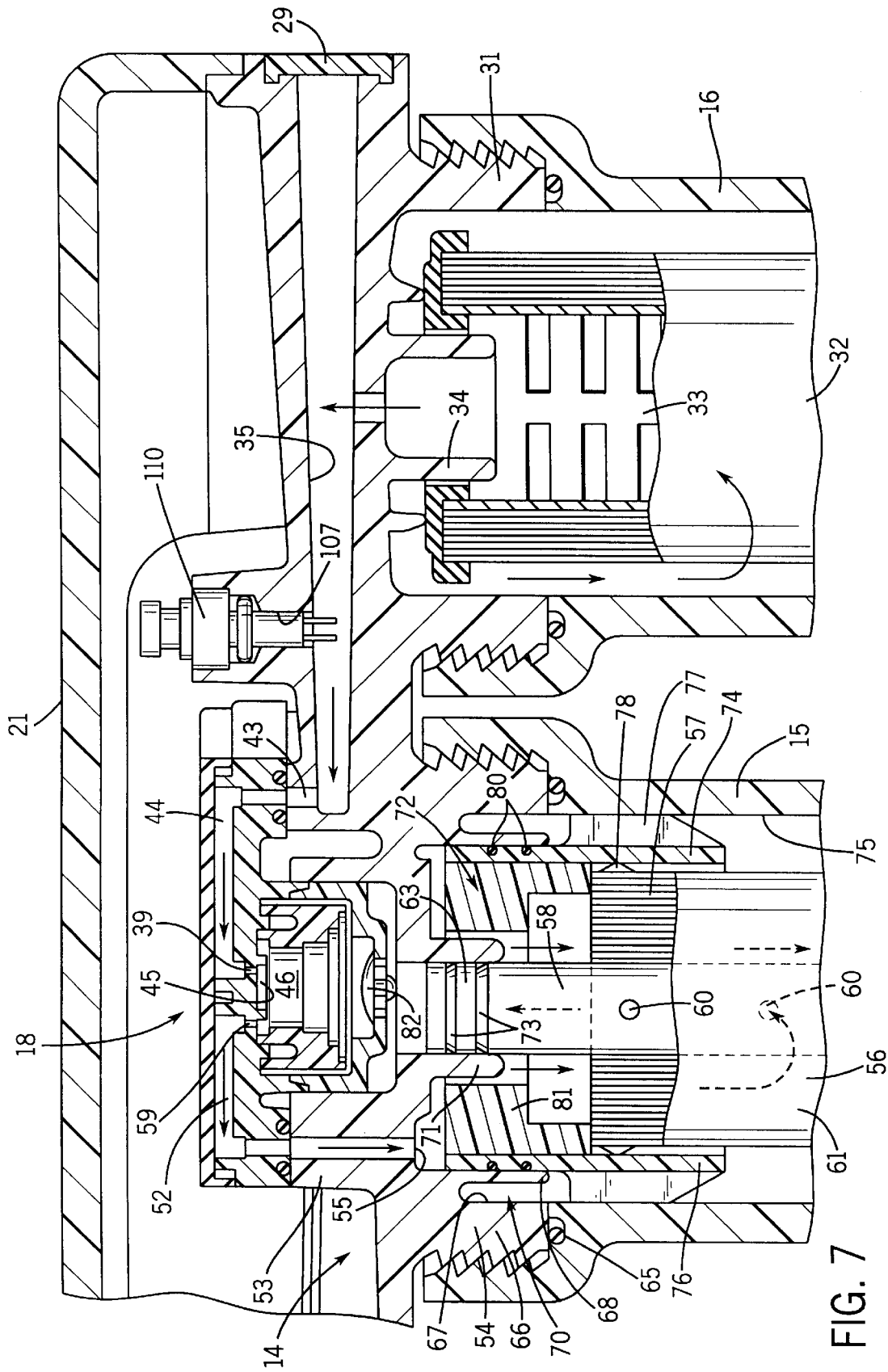
FIG. 7 is a sectional detail taken on line 7—7 of FIG. 4.

Referring particularly to FIGS. 2 and 7, an RO filter cartridge 56, which may be of a generally well known construction, includes an interior spirally wound semipermeable membrane 57 which may include an intermediate separator layer. The membrane 57 is wound around a central hollow product water tube 58, the product water being the permeate from membrane filtration. The product water tube 58 extends the length of the cartridge 56 and is provided in its outer surface over which the membrane is wound with a pattern of through holes 60. The membrane is closed by an impervious outer wrap 61 of plastic or other suitable material. The upper end of the tube 58 extends beyond the membrane 57 to define a cylindrical neck 63. The lower end of the product water tube 58 includes an extension that supports the cartridge 56 above the bottom of the housing 15. In this manner, both ends of the membrane 57 are open to liquid flow. The open upper end of the membrane 57 is exposed to the incoming flow of untreated water, or more correctly with respect to the overall system, the incoming flow of pre-filtered water, entering the open space defined by the RO connection boss 54 via the supply flow opening 55 in the manifold. Although membrane filter cartridges 56 of the type described herein can accommodate untreated water flow through either end, the cartridge in the present embodiment is oriented with the untreated water inlet on the upper end.

The RO connection boss 54 is defined by a cylindrical sleeve 66 which is threaded on its OD for receipt of the threaded ID of the open upper end of the RO filter housing 15, with the interface sealed with a large O-ring seal 65. The main portion of the boss, defining the cylindrical outer sleeve 66, includes the threaded outer wall and a cylindrical inner wall 67. The boss also defines a cylindrical intermediate sleeve 68 concentric with the outer sleeve and defining therewith a first annular space 70. A cylindrical inner sleeve 71 at the center interior of the boss 54 defines with the intermediate sleeve 68 a second annular space 72. The interior of the cylindrical inner sleeve 71 is sized to receive the cylindrical neck 63 of the RO cartridge product water tube 58 with the interface therebetween sealed by a pair of O-ring seals 73.

A cylindrical brine ring 74 is fixed to the upper end of the inner wall 75 of the housing 15. The brine ring 74 comprises a generally cylindrical tubular sleeve 76 from the outer wall of which extend a number of circumferentially spaced attachment ribs 77 by which the brine ring is secured to the inner wall 75 of the housing by sonic welds or a snap fit. A brine seal 78 is attached circumferentially to the outer wrap 61 of the RO filter cartridge 56 and bears against the interior of the brine ring sleeve 76 in a manner generally known in the prior art. The upper end of the tubular brine ring sleeve 76 extends into the second annular space 72 in the boss and is sealed against a cylindrical inner surface of the intermediate sleeve 68 with a pair of O-ring seals 80. The assembly may also include a locking ring 81 that holds the RO filter cartridge 56 within the housing 16 such that, when the housing is unthreaded from the boss 54 (as for filter cartridge replacement), the housing and cartridge will be removed together and the latter will not hang-up on the cylindrical inner sleeve 71. This entire arrangement is known in the art and described in more detail in U.S. Pat. No. 5,891,334 which is incorporated herein by reference.

Incoming pre-filtered water passing into the second annular space 72 from the supply flow opening 55 passes into the upper end of the RO membrane then flows vertically downwardly along the interior of the element. As is well known in the art, the membrane permeate which is the desired product water flows radially inwardly, eventually through the holes 60 in the product water tube 58 and then vertically upwardly along the interior of the tube. The brine flow or high volume membrane concentrate of water and dissolved solids which do not pass through the membrane, flows vertically downwardly and exits the cartridge 56 at the bottom end. The volume of brine may comprise about 80% of the total incoming volume of pre-filtered water, but the proportions may change depending on other changes in system operation as will be discussed in more detail hereinafter.

Figure 15A:
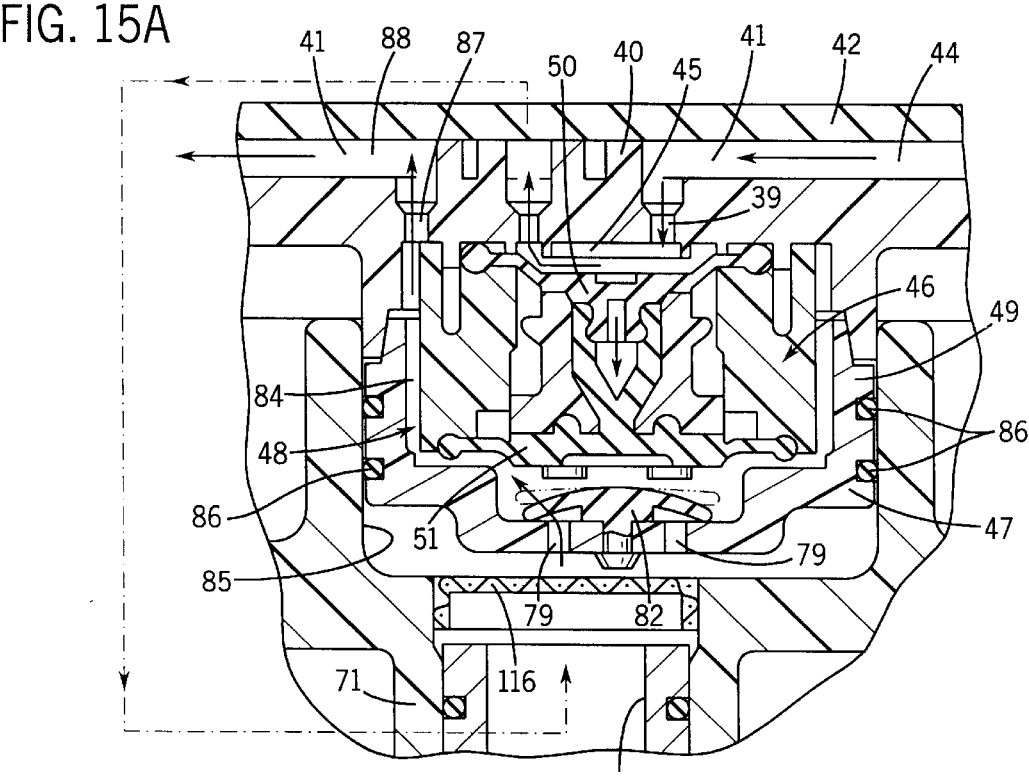
FIGS. 15A and 15B are sectional details taken on line 15-AB—15AB of FIG. 12 and showing the shutoff valve in its respective open and closed positions.

Referring also to FIG. 15A, the membrane permeate (product water) passes upwardly from the product water tube 58 and into a chamber 48 formed by the combination of the side wall 49 of the closure plate 47 and the recess 45 in the body 40 of the control module 18. Passage into the chamber 48 is via product water openings 79 in closure plate 47 which openings are closed by an umbrella check valve 82 that prevents reverse flow of product water back into the RO filter element. Simultaneously, the flow of brine (membrane concentrate) out of the lower end of the cartridge 56 passes upwardly along the annular space between the filter cartridge 56 and the interior wall of the housing 15 and through the space between the brine ring 74 and the inside of the housing, into the first annular space 70 and into a brine flow opening 93 (FIG. 8) extending vertically through the manifold 14.

With flow taking place in the manner thus far described, product water (membrane permeate) passes upwardly around the outside of the diaphragm shutoff valve 46 through an annular flow space 84 in the chamber 48 between the valve and combined interior walls of the cylindrical recess 45 and closure plate 47. The lower portion of the control module 18 defined substantially by the cylindrical side wall 49 of the closure plate 47 is seated in a large cylindrical counter bore 85 formed in the manifold 14 above and in communication with the interior of the cylindrical inner sleeve 71. The interface between the counterbore 85 and the side wall 49 of closure plate 47 is sealed by a double O-ring seal 86.

Figure 9:
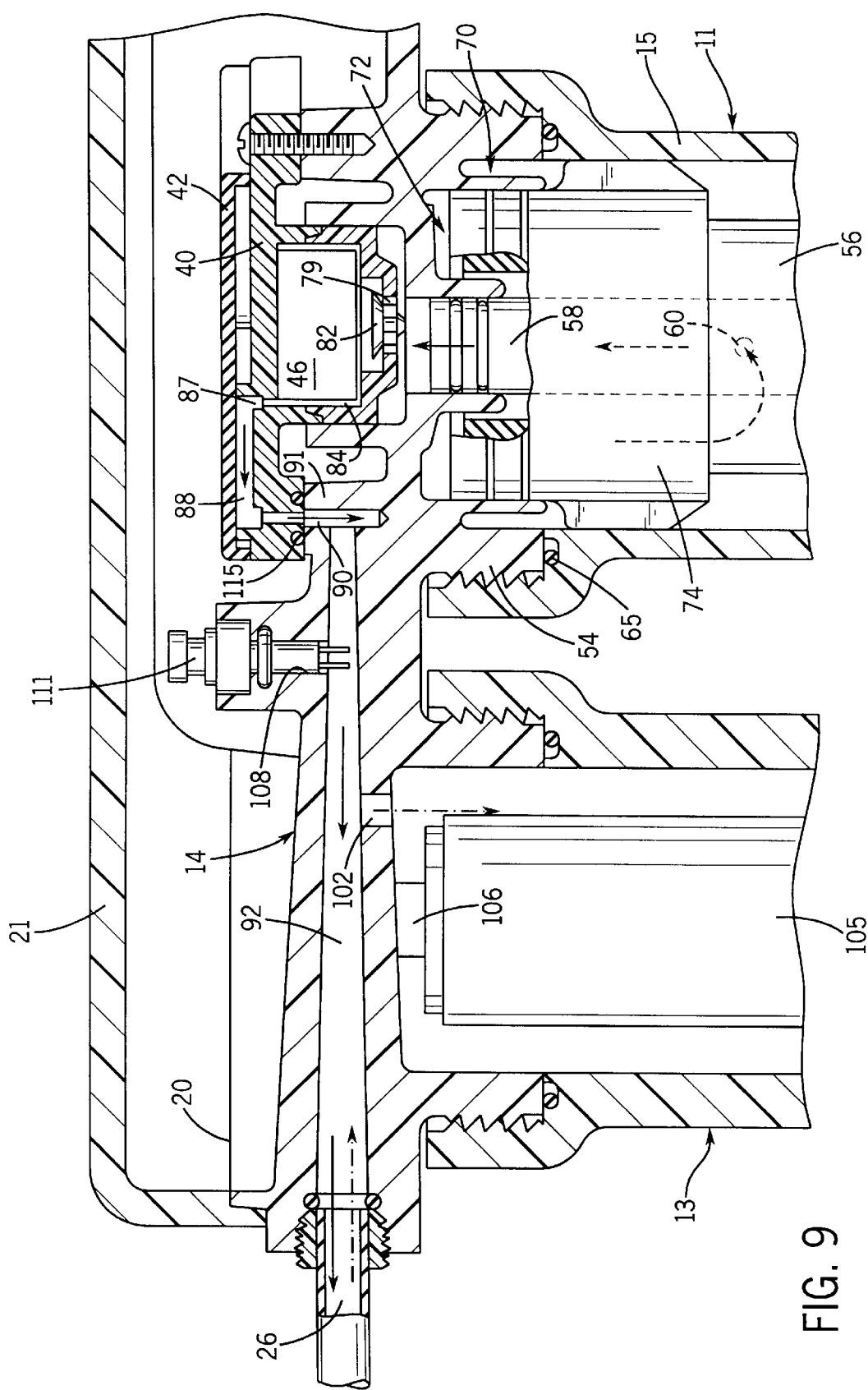
FIG. 9 is a sectional detail taken on line 9—9 of FIG. 4.
Figure 10:
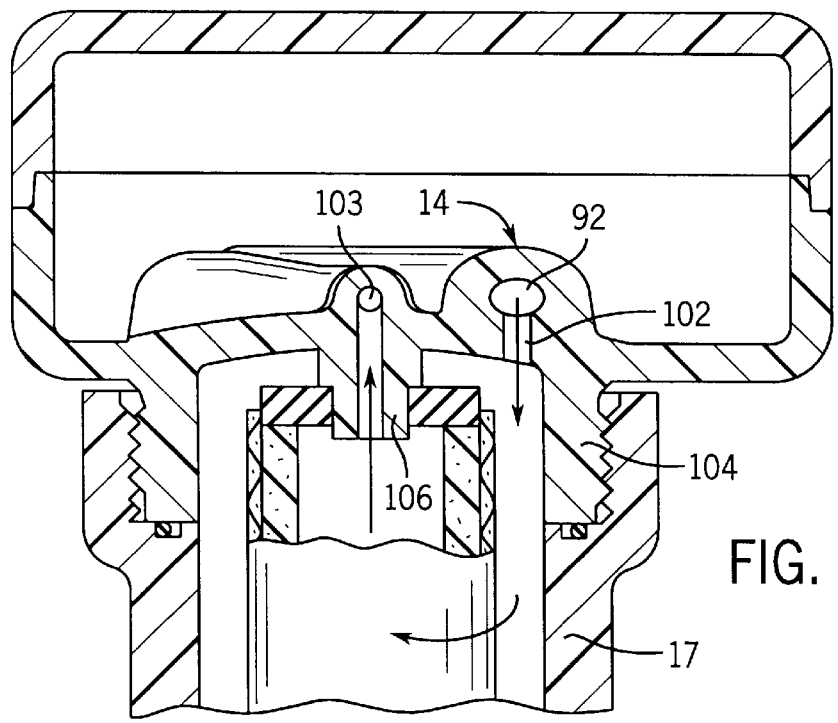
FIG. 10 is a sectional detail taken on line 10—10 of FIG. 4.
Figure 11:
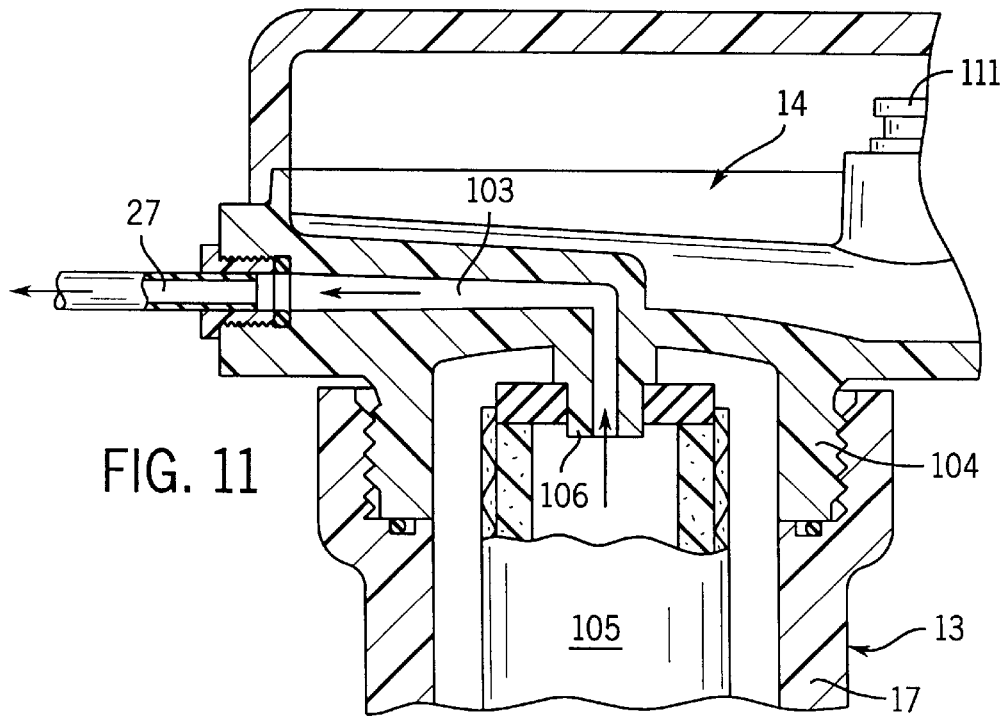
FIG. 11 is a sectional detail taken line 11—11 of FIG. 4.

Referring also to FIG. 9, permeate (product water) flow through the annular space 84 connects via a permeate outlet opening 87 to the upstream end of a permeate outlet passage 88 comprising one of the flow channels 41 formed in the upper surface of the control module body 40. The downstream end of the permeate outlet passage 88 connects to a permeate flow opening 90 extending through a small tubular inlet sleeve 91 in the manifold 14. In this manner, the flow path past the umbrella check valve 82, through annular flow space 84, permeate outlet opening 87 and permeate outlet passage 88 provides a permeate flow interconnection between the filter unit 54 and a main permeate flow path 92 formed in the manifold 14.

Figure 8:
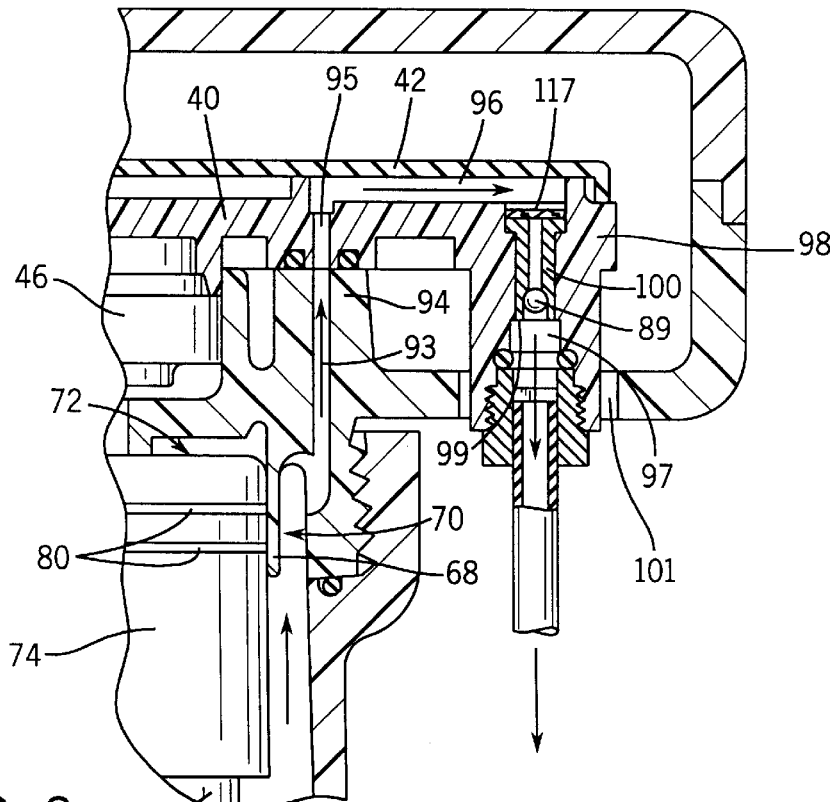
FIG. 8 s a sectional detail taken on line 8—8 of FIG. 4.

Simultaneously with the flow of product water (or permeate) through the control module and into the main permeate flow path 92 and referring also to FIG. 8, the flow of brine (or membrane concentrate) passes from the first annular space 70 upwardly through a brine flow opening 93 that extends through a small tubular brine sleeve 94 in the manifold at the base of the first annular space 70. The brine flow opening 93 connects directly to a brine flow inlet 95 in the overlying control module body 40. The brine flow inlet 95, in turn, connects to the upstream end of a brine outlet passage 96 that also comprises one of the flow channels 41 formed in the upper surface of the control module body 40. At the downstream end of the brine outlet passage 96 is a downwardly depending brine discharge passage 97 formed in a brine discharge sleeve 98. The lower end of the discharge sleeve 98 extends through a discharge opening 101 in the manifold body. The open end of the discharge sleeve preferably includes a connection to a length of flexible tubing directing the brine flow to a drain.

A flow control valve 100 is inserted in the brine discharge passage 97 at the downstream end of the brine outlet passage 96. The flow control valve 100 may comprise a conventional restrictor valve including a ball 89 and a seat 99 which is slotted to permit a restricted flow of brine past it. The flow control valve 100 is designed to create a concentrate back pressure sufficient to cause a desired volume of water to be forced through the RO membrane to produce the product water permeate. Generally and on average, a ratio of concentrate to permeate of about 5:1 to 4:1 is desirable. The ratio will vary from initial startup as the increasing permeate back pressure from the pressurized storage tank counters inlet line pressure, thereby reducing somewhat permeate flow volume.

Figure 15B:
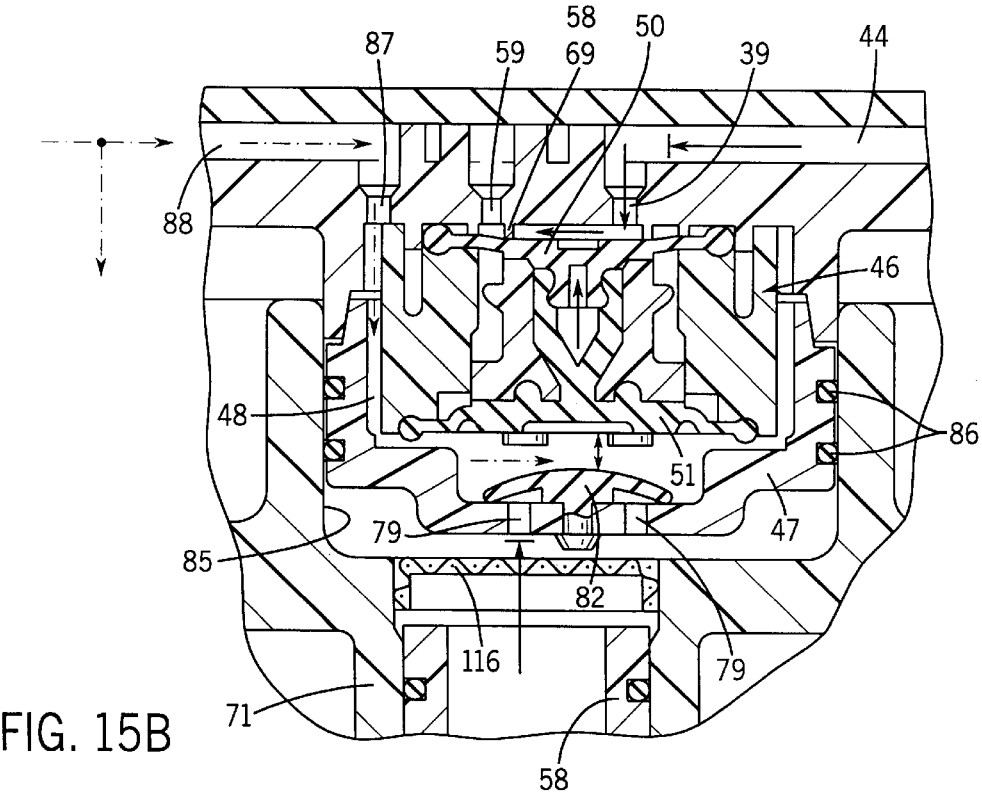

Filtered product water entering the main permeate flow path 92 from the control module 18 normally exits the manifold 14 via the product water outlet/inlet 26 from which it passes to the pressurized storage tank 9. Such storage tanks are well known in the art and may include an interior flexible bladder or wall to one side of which the product water flows and on the other side of which is an air space. As product water fills the storage tank and presses against the flexible bladder, the air on the opposite side is compressed and thus the purified water is stored under pressure. It is also known in the art to supply brine to the opposite wall of the bladder to pressurize the purified water stored in the tank. Referring also to FIG. 15B, when the pressure in the storage tank reaches a desired level, storage tank back pressure acts on the lower diaphragm 51 of the shutoff valve 46 in the control module to overcome the counter pressure of pre-filtered inlet flow against the opposite upper diaphragm 50, causing the latter to move upwardly and to shut off the incoming flow. The areas of the respective upper and lower diaphragms 50 and 51 may be chosen to match a desired maximum storage tank pressure to the usual line pressure, for example, the pressure of the municipal supply of water. For example, with a typical municipal water supply pressure of 60 psi and a desired storage tank pressure of 40 psi, the area of the lower diaphragm 51 (exposed to storage tank pressure) would be about two-thirds the area of the upper diaphragm 50. Then, at about 40 psi of tank pressure, the 60 psi inlet line pressure would be overcome and the shutoff valve 46 would close.

Referring particularly to FIGS. 3 and 9–11, when a user opens the faucet connected to the final water outlet 27 from the manifold, pressurized water in the storage tank flows in reverse back into the manifold via the product water outlet/inlet 26 and into the main permeate flow path 92. The umbrella check valve 82 in the flow control module 18 prevents pressurized product water from returning to the RO filter unit 11. Instead, a product water cross flow passage 102 in the main permeate flow path 92 directs the flow from the storage tank into the post-filter housing 17 and through the post-filter unit 13, and then through a final water passage 103 in the manifold to the final water outlet 27 leading to the user faucet (not shown). The manifold includes a post-filter connection boss 104 to which the post-filter housing 17 is threadably attached. The post-filter element 105 may be of any suitable type, such as a granular carbon cartridge or a porous carbon block filter element. The cross flow passage 102 directs water into the annular space between the interior of the housing 17 from which it flows through the filter element 105 to an outlet sleeve 106 centered in the post-filter connection boss 104 which connects directly to the final water passage 103.

If the user opens the faucet when storage tank back pressure has not yet shut off the flow through the RO filter unit 11, product water from that unit will flow directly into the post-filter unit 13 via the cross flow passage 102, through the post-filter and out of the system to the faucet, as just described above.

The system is also adapted to utilize conductivity measurement of the pre-filtered water entering the RO filter unit and product water exiting the unit to provide an indication of the relative efficiency of the RO unit. Referring to FIGS. 2–4, 16A and 16B, a first probe access passage 107 is formed in the pre-filtered water connection 35 of the manifold for receipt of a conductivity probe 110. Similarly, a second probe access passage 108 is formed in the main permeate flow path 92 for receipt of a second conductivity probe 111. Integrally molded with the manifold and located inside the peripheral wall 20 are mounting slots 112 for a power supply and circuit board for operation of conductivity probes 108 and 111. The circuit board provides microprocessor control and connections to external monitoring lights 113 in the peripheral wall and a push button switch 114 allowing the user to periodically test the conductivity. This type of conductivity monitoring to determine the relative solids removal efficiency of the RO membrane filter is old and generally well known in the art.

Referring again to FIG. 14, when the control module 18 is attached to the manifold 14, by threading the mounting screws 37 through suitable mounting holes 36 in the control module body 40 and into the mounting bosses 38 on the manifold, each of the fluid connections between the passages in the control module body 40 and the respective tubular inlet sleeves 43, 53, 91 and 94 is sealed by a small sealing ring 115. Although the control module 18 may be easily removed (by removal of the mounting screws 37) such that the entire module may be replaced, it is also possible to replace individually any one of the shut off valve 46, check valve 82, or flow control valve 100. It is preferred, however, that the cover plate 42 and the closure plate 47 be permanently attached to the control module main body 40, thus restricting individual replacement of any of the several valves 46, 82 and 100.

A small filter screen element 116 (FIGS. 15A and 15B) may be placed in the upper end of the cylindrical inner sleeve 71 at the center of the RO filter connection boss 54. Similarly, another small filter screen element 117 (FIG. 8) may be placed in the brine outlet passage 96 just upstream of the brine flow control valve 100. This small screen 117 is intended to prevent small particles in the brine flow from clogging the flow restrictor slots in the seat 99 of the flow control valve 100. Porosity of the filter elements 116 and 117 may be in the range of approximately 50–100 microns.

We claim:
1. In a water filter system having a semi-permeable membrane filter unit, a manifold operatively connected to the membrane filter unit, said manifold having a supply flow path for directing a pressurized flow of raw water to the membrane filter unit, a permeate flow path for directing membrane permeate to a pressurized storage tank, and a brine flow path for directing membrane concentrate to a drain, a unitary control module comprising:
   a control housing independent of and demountably attached to the manifold and providing a supply flow interconnection in the supply flow path to the filter unit, a permeate flow interconnection in the permeate flow path, and a brine flow interconnection in the brine flow path; said control housing entirely enclosing therein:
(1) a pressure responsive shutoff valve responsive to a pressure differential between the water pressure in the supply flow interconnection and storage tank pressure in the permeate flow interconnection to control the flow of raw water;
(2) a flow control valve in the brine flow interconnection to create a desired level of membrane back pressure; and,
(3) a check valve in the permeate flow interconnection to prevent permeate back flow into the filter unit.

2. The invention as set forth in claim 1 wherein the membrane filter unit includes a reverse osmosis filter cartridge removably contained in an open-ended filter housing, said filter housing having a threaded open upper end, and wherein said manifold overlies the filter unit and includes a downwardly depending threaded boss, the threaded open end of said filter housing being demountably attached to the manifold boss to hold the filter cartridge in operative fluid communication with the control module, and further comprising:
a supply flow outlet in said control housing in direct fluid communication with a supply flow opening in the manifold boss;
a permeate flow inlet in said control housing in direct fluid communication with a permeate flow opening in the manifold boss; and,
a brine flow inlet in said control housing in direct fluid communication with a brine flow opening in the manifold boss.

3. The invention as set forth in claim 2 wherein the manifold boss comprises a cylindrical outer sleeve, a cylindrical intermediate sleeve concentric with said outer sleeve and defining therewith a first annular space, a cylindrical inner sleeve concentric with said intermediate sleeve and defining therewith a second annular space; and,
said brine flow opening communicating with said first annular space, said supply flow opening communicating with the second annular space, and said permeate flow opening being defined by the interior of said inner sleeve.

4. The invention as set forth in claim 3 further comprising:
said filter cartridge including a membrane wrapped on a hollow tubular core and covered with an outer impervious layer, said membrane having open upper and lower ends, said cartridge contained in the filter housing to define an open space between the outer layer and open lower end of the cartridge and the interior of the filter housing;
said first annular space communicating with said open space, said second annular space communicating with the open upper end of the membrane, and the interior of said inner sleeve communicating with the hollow tubular core; and,
first sealing means for preventing a cross flow of liquid between said first annular space and said second annular space, and second sealing means for preventing a cross flow of liquid between said second annular space and the interior of said inner sleeve.

5. The invention as set forth in claim 3 wherein said control housing comprises:

a molded plastic body having integrally molded therein said supply flow interconnection, said permeate flow interconnection, said brine flow interconnection, and a recess for said shutoff valve; and
means for mounting the body to the manifold to effect the respective interconnections.

6. The invention as set forth in claim 5 wherein said interconnections comprise flow channels molded in a common surface of the body and a cover plate overlying and enclosing the channels to form flow passages.

7. A reverse osmosis water purification system comprising;
a tubular reverse osmosis membrane filter cartridge having a water inlet on one axial end and a brine outlet on the opposite axial end, and an axially extending central product water tube having one open end defining a product water outlet from the cartridge;
an open-ended housing enclosing said cartridge with the open end of the tube positioned in the housing open end, said housing open end defined by a threaded neck;
a flow distribution manifold overlying the housing and filter cartridge, said manifold including a downwardly depending connection boss having an outer threaded end adapted to connect to the threaded neck of the housing, said boss cooperating with the housing and cartridge to define separate mutually sealed inlet water, brine water and product water spaces communicating respectively with said water inlet, said brine outlet and said product water outlet, said manifold having flow openings communicating with each of the spaces; and,
a unitary control module connected directly to said flow openings and comprising a control housing, said control housing demountably attached to the manifold and entirely enclosing therein the following: a first flow interconnection between said inlet water space and a pressurized source of inlet water, a second flow interconnection between said brine water space and a drain, a third flow interconnection between said product water space and a pressurized product water storage tank, a differential pressure shutoff valve having one operative connection to said first flow interconnection and an opposite operative connection to said third flow interconnection, a check valve in said third flow interconnection to prevent back flow into said product water space, and a flow control valve in said second flow interconnection to apply back pressure to the brine outlet end of said membrane cartridge.

8. The system as set forth in claim 7 wherein said manifold comprises a unitary molded construction with the manifold flow openings extending generally vertically upwardly from said inlet water, brine water and product water spaces;
wherein said control housing comprises a molded plastic body having integrally molded therein said first, second and third flow interconnections, said plastic body overlying the manifold to provide direct connection between each of said flow interconnections and one of said manifold flow openings; and,
demountable fasteners extending through said body into fastening engagement with the manifold.

9. The system as set forth in claim 8 wherein said flow interconnections comprise flow channels molded in an upper surface of the body, and a separate cover plate overlying and closing the channels to form sealed flow passages.

10. The system as set forth in claim 8 wherein said shutoff valve, said check valve and said flow control valve are each mounted in the control housing body.

11. The system as set forth in claim 7 wherein the source of inlet water comprises a pre-filtered water connection in said manifold including an upstream connection to an outlet from a pre-filter.

12. The system as set forth in claim 11 wherein the manifold includes a pre-filter connection boss defining said upstream connection and having demountably attached thereto a pre-filter unit.

13. The system as set forth in claim 7 including a product water flow path in the manifold connecting said third flow interconnection and the product water storage tank.

14. The system as set forth in claim 13 including a cross flow passage in said product water flow path defining an inlet to a post-filter unit.

15. The system as set forth in claim 14 wherein the manifold includes a post-filter connection boss defining said cross flow passage and having demountably attached thereto said post-filter unit.

* * * * *

UNITED STATES PATENT AND TRADEMARK OFFICE
CERTIFICATE OF CORRECTION

PATENT NO.   : 6,436,282 B1
DATED        : August 20, 2002
INVENTOR(S)  : Gundrum et al.

It is certified that error appears in the above-identified patent and that said Letters Patent is hereby corrected as shown below:

Column 1,
Line 50, please delete "fall" and insert -- full -- therefor.
Line 63, please delete "entirely enclosing" and insert -- entirely encloses -- therefor.

Signed and Sealed this

Twenty-fifth Day of February, 2003

JAMES E. ROGAN
*Director of the United States Patent and Trademark Office*